United States Patent
Miyazawa

(10) Patent No.: US 8,811,809 B2
(45) Date of Patent: Aug. 19, 2014

(54) IMAGE STABILIZATION APPARATUS, CONTROL METHOD THEREFOR, OPTICAL APPARATUS AND IMAGING APPARATUS

(71) Applicant: Canon Kabushiki Kaisha, Tokyo (JP)

(72) Inventor: Hitoshi Miyazawa, Kuki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/685,955

(22) Filed: Nov. 27, 2012

(65) Prior Publication Data
US 2013/0163972 A1 Jun. 27, 2013

(30) Foreign Application Priority Data
Dec. 21, 2011 (JP) ................................. 2011-280244

(51) Int. Cl.
*G03B 17/00* (2006.01)
*H04N 5/228* (2006.01)
*H04N 5/232* (2006.01)
*G03B 5/00* (2006.01)
*G03B 15/00* (2006.01)

(52) U.S. Cl.
CPC .......... *G03B 15/00* (2013.01); *G03B 2217/005* (2013.01); *H04N 5/23258* (2013.01); *G03B 5/00* (2013.01); *G03B 2205/0015* (2013.01); *H04N 5/23267* (2013.01)
USPC ........................................ 396/55; 348/208.99

(58) Field of Classification Search
USPC ................. 396/55; 348/208.99, 208.1, 208.2, 348/208.4, 208.7, 208.11
See application file for complete search history.

(56) References Cited

U.S. PATENT DOCUMENTS
8,471,916 B2 * 6/2013 Washisu ................... 348/208.99

FOREIGN PATENT DOCUMENTS
JP 07-225405 8/1995

* cited by examiner

*Primary Examiner* — W B Perkey
*Assistant Examiner* — Minh Phan
(74) *Attorney, Agent, or Firm* — Cowan, Liebowitz & Latman, P.C.

(57) ABSTRACT

An image stabilization apparatus, having a vibration correction unit that corrects image blur due to vibrations, detects an angular velocity of vibrations with a first vibration detection unit, calculates a rotational shake correction amount based on an output from the first vibration detection unit, detects vibrations with a second vibration detection unit, calculates a correction value from the outputs of the first and second vibration detection units, calculates a translational shake correction amount based on the correction value and the output of the first vibration detection unit, and drives the vibration correction unit based on at least one of the rotational or translational shake correction amounts. The image stabilization apparatus changes the translational shake correction amount to a smaller value when a main object accounts for a smaller proportion of an entire screen.

16 Claims, 11 Drawing Sheets

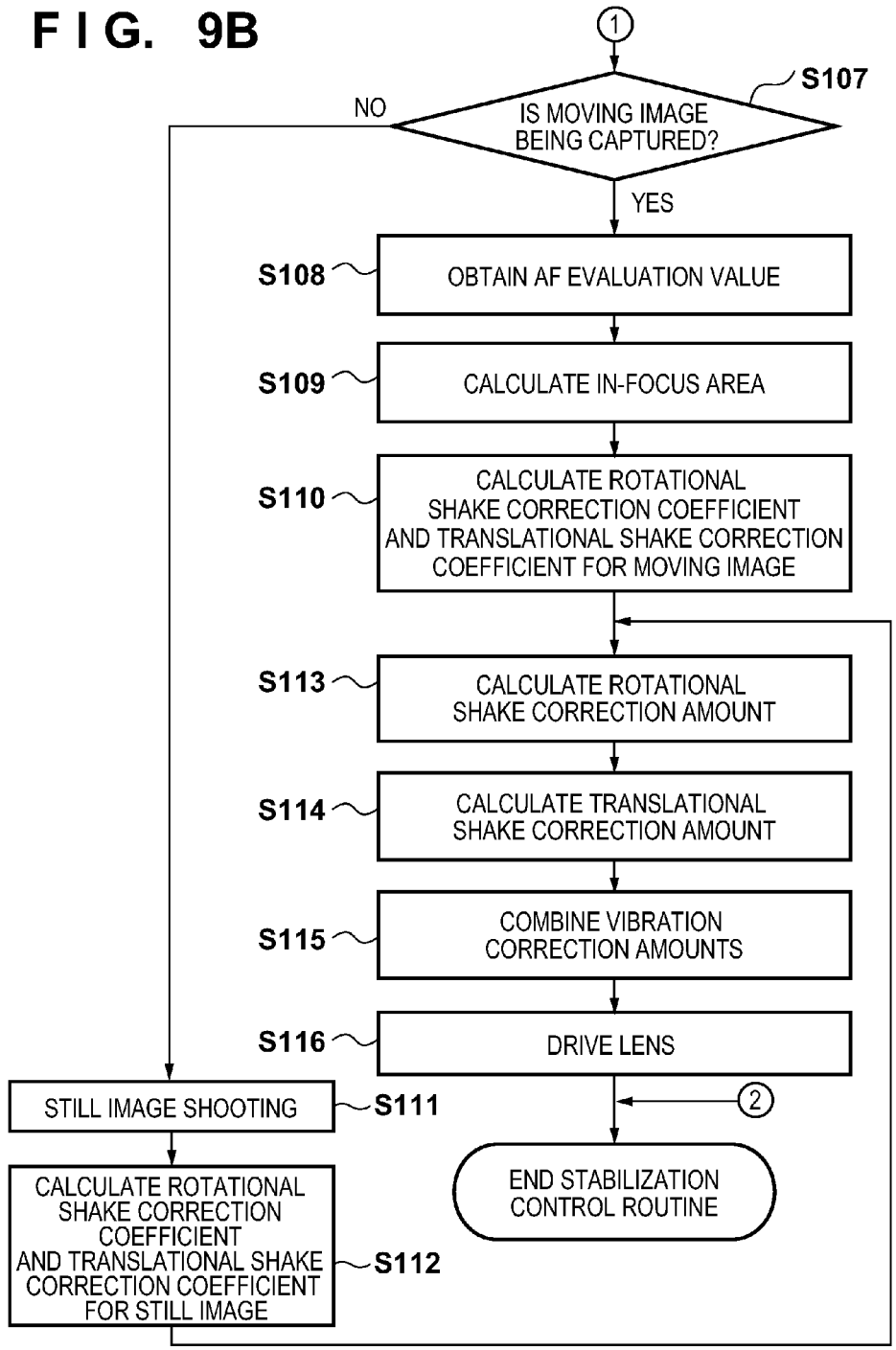

IMAGE STABILIZATION APPARATUS, CONTROL METHOD THEREFOR, OPTICAL APPARATUS AND IMAGING APPARATUS

BACKGROUND OF THE INVENTION

1. Field of the Invention

The present invention relates to an image stabilization apparatus that compensate image blur (image degradation) caused by shakes such as hand shakes, and relates to a control method for such an image stabilization apparatus, an optical apparatus, and an imaging apparatus.

2. Description of the Related Art

At present, cameras provided with image stabilization apparatuses that prevent image blur caused by hand shakes and are configured with, for example, a shake compensation unit, a driving unit, and a shake detection unit are in commercial production, and as a result, user-caused shooting mistakes are decreasing.

Camera shake caused by hand shakes of a user is usually within a frequency range of 1 to 10 Hz. In order to capture a blur-free photo even if such hand shakes occurs at the time of shutter release, a unit is conventionally provided that detects camera vibrations caused by hand shake and moves a lens for correcting image blur (hereinafter referred to as a "correction lens") according to the detected values.

In order to capture a blur-free photo even if camera vibrations occur, it is necessary to accurately detect camera vibrations and correct shifts of an optical axis caused by vibrations such as camera shakes. In principle, detection of camera vibrations (camera shakes) is possible by incorporating, in a camera, a vibration detection unit that detects acceleration, angular acceleration, angular velocity, angular displacement or the like and processes the output as appropriate. Then, by an image stabilization unit (specifically, correction lens) being driven by a driving unit, the image stabilization unit whose optical axis is moved based on the vibrations from the vibration detection unit, image blur control is performed.

As an example, a stabilization control apparatus that detects rotational shakes by using an angular velocity sensor and moves a part of the lens or an image sensor so as to reduce vibrations on the image sensor surface is incorporated in various optical apparatuses as an effective vibration correction function.

However, when shooting at close ranges, shooting at a high magnification ratio, and so on, image degradation caused by what are known as "translational shakes" (parallel shakes), which act in the translational or vertical direction relative to the optical axis of the camera and cannot be detected solely by an angular velocity sensor, cannot be ignored. It is necessary to actively detect and compensate translational shakes in, for example, the case where an image is shot from approximately 20 cm from the subject, as in macro shooting, the case where the focal length of the photographing optical system is extremely long (for example, 400 mm) when the camera is approximately 1 m away from the subject, and so on.

Japanese Patent Laid-Open No. 7-225405 discloses a technique where an acceleration sensor that detects acceleration is provided, translational shakes are found from a second-order integral of the acceleration obtained by the acceleration sensor, and a shake compensation unit is driven based on the translational shake and the output of a separate angular velocity sensor.

However, when shooting a moving image, there are cases where it is better to weaken translational shake correction depending on the in-focus area of the main object. An example of such a case is close range shooting. During close range shooting, because a significant error occurs in the correction amount due to the difference in magnification ratio, if the vibration correction amount is not adjusted for each object distance, it is not possible to perform good vibration correction on the entire screen. Specifically, in the case where sufficient vibration correction is performed on a main object, the distance to which is 10 cm, its background (for example, the object distance is 1 m) is not sufficiently corrected, instead, the image blur may become worse (overcorrection). Particularly when shooting a moving image, unlike still image shooting, its influence is constantly recorded, which may cause user discomfort.

This will now be described in further detail. As described above, there are two types of vibrations affecting an imaging apparatus: rotational shakes in which the imaging apparatus swings about the center of rotation; and translational shakes in which the entire imaging apparatus moves in parallel. Image degradation due to rotational shakes becomes worse as the object distance and the focal length of the imaging apparatus become longer. Image degradation due to translational shakes is greatly correlated with the object distance and the focal length (image magnification), and thus the degradation becomes worse as the image magnification becomes larger (as the object distance becomes shorter and the focal length becomes longer). Under ordinary photographic conditions (for example, when the object distance is 1 m), the influence of image degradation by translational shakes can be substantially ignored.

However, in the case of close range shooting (for example, when the object distance is 10 cm), because the magnification ratio is high, the influence of image degradation by translational shakes cannot be ignored. In this case, for example, an optical image stabilization system performs detection using an acceleration sensor or the like, and an electronic image stabilization system detects translational shakes by detecting image blur, and corrects the vibrations according to the results of detection.

However, various objects at different distances are present in the screen. Accordingly, when vibration correction is performed with respect to the distance to the main object, the main object can be prevented from image degradation due to translational shakes. On the other hand, with respect to the background and the other objects at different distances, the vibration correction is not sufficiently performed, instead, it may cause image degradation.

SUMMARY OF THE INVENTION

The present invention has been made in consideration of the above situation, and is to obtain images with a high level of stabilization accuracy by performing vibration correction for the main object and vibration correction for the background in good balance during moving image shooting.

According to the present invention, provided is an image stabilization apparatus comprising: a vibration correction unit that corrects image blur due to vibrations; a first vibration detection unit that detects an angular velocity of vibrations; a first calculation unit that calculates a rotational shake correction amount based on an output from the first vibration detection unit; a second vibration detection unit that detects vibrations by using a method different from that of the first vibration detection unit; a second calculation unit that calculates a correction value from outputs from the first vibration detection unit and the second vibration detection unit and calculates a translational shake correction amount based on the correction value and the output of the first vibration detection unit; a driving unit that drives the vibration correction unit based on at least one of the rotational shake correction amount and the translational shake correction amount; and a changing unit that, when a main object accounts for a smaller proportion of an entire screen, changes the translational shake correction amount so as to be smaller than that when the main object accounts for a larger proportion.

Further, provided is an optical apparatus comprising the image stabilization apparatus as described above.

Furthermore, provided is an imaging apparatus comprising the image stabilization apparatus as described above.

Further, provided is a control method for an image stabilization apparatus including a vibration correction unit that corrects image blur due to vibrations, the method comprising: detecting an angular velocity of vibrations with a first vibration detection unit; calculating a rotational shake correction amount based on an output from the first vibration detection unit; detecting vibrations with a second vibration detection unit by using a method different from that of the first vibration detection unit; calculating a correction value from the output of the first vibration detection unit and an output of the second vibration detection unit and calculating a translational shake correction amount based on the correction value and the output of the first vibration detection unit; driving the vibration correction unit based on at least one of the rotational shake correction amount and the translational shake correction amount; and changing, when a main object accounts for a smaller proportion of an entire screen, the translational shake correction amount so as to be smaller than that when the main object accounts for a larger proportion.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 9A and 9B show flowcharts illustrating a procedure of stabilization control processing according to the first embodiment;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

<First Embodiment>

Figure 1:
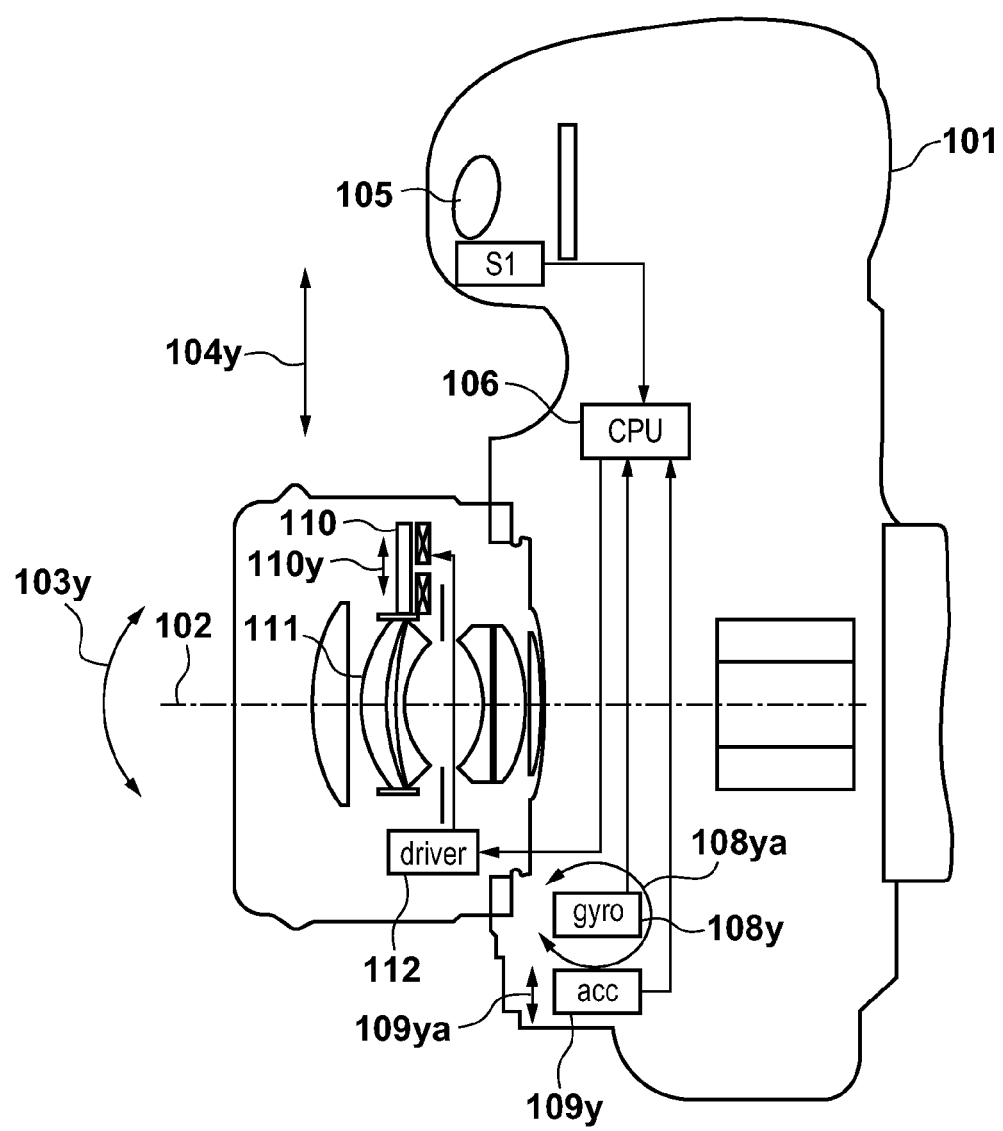
FIG. 1 is a general diagram illustrating the functional configuration of a camera embodying an image stabilization apparatus, viewed from above, according to an embodiment of the present invention.
Figure 2:
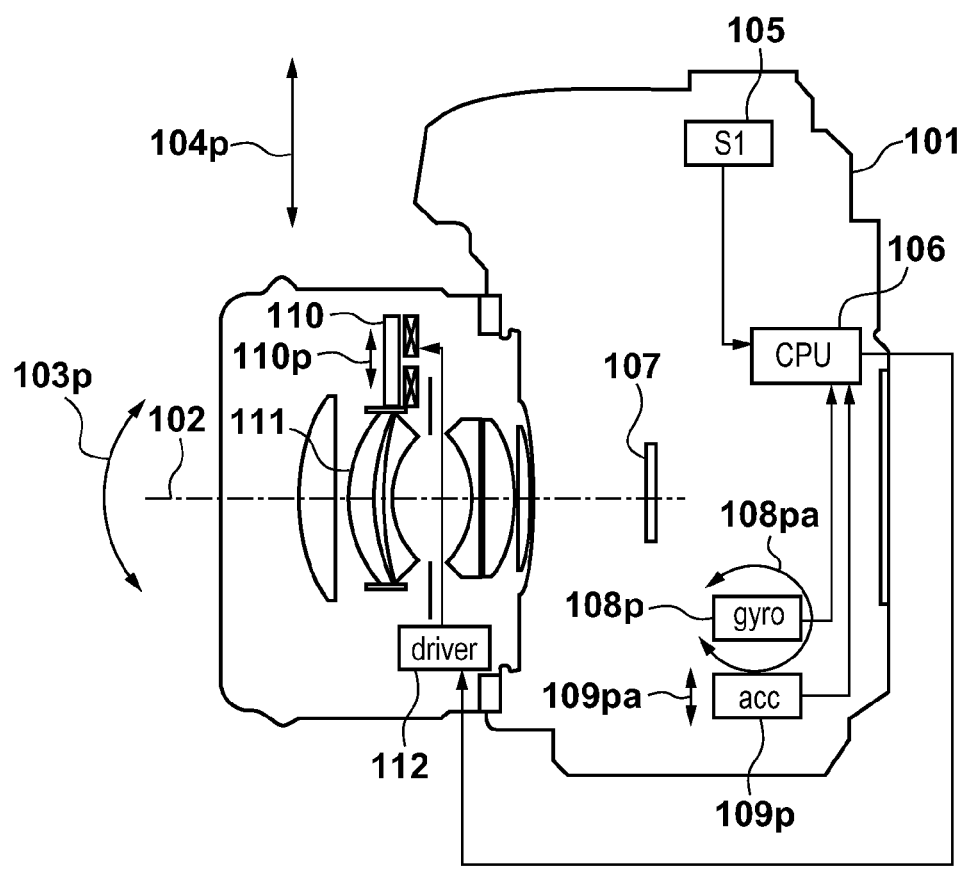
FIG. 2 is a general diagram illustrating the functional configuration of a camera embodying the image stabilization apparatus, viewed from the side, according to an embodiment of the present invention.

FIGS. 1 and 2 are general diagrams illustrating the functional configuration of a camera 101 embodying an image stabilization apparatus according to a first embodiment of the present invention, viewed from above and from the side, respectively. A stabilization system provided in this camera 101 compensates shakes indicated by arrows $103p$ and $103y$ relative to an optical axis 102 (called "rotational shakes" hereinafter) and shakes indicated by arrows $104p$ and $104y$ relative to the optical axis 102 (called "translational shakes" hereinafter).

The camera 101 includes a release switch 105, a camera CPU 106, an image sensor 107, and angular velocity sensors $108p$ and $108y$ that detect rotational shakes indicated by arrows $108pa$ and $108ya$, respectively. The camera 101 further includes acceleration sensors $109p$ and $109y$ that detect translational shakes indicated by arrows $109pa$ and $109ya$, respectively, using a different method than the angular velocity sensors $108p$ and $108y$. The camera 101 also includes a vibration correction unit 110, which freely drives a shake compensation lens 111 along the directions of the arrows $110p$ and $110y$, thus compensating both rotational shakes and translational shakes. Note that the outputs of the angular velocity sensors $108p$ and $108y$ and the acceleration sensors $109p$ and $109y$ are input into the camera CPU 106. A driving unit 112 then compensates for shakes based on these outputs.

Note that in the present first embodiment, what is known as "optical image stabilization", in which the shake compensation lens 111 is moved along a plane that is perpendicular to the optical axis based on a calculated compensation amount, is used to compensate shakes. However, the shake compensation method is not limited to optical image stabilization, and a method that carries out stabilization by moving the image sensor along a plane that is perpendicular to the optical axis, a method that employs electronic image stabilization that reduces the influence of shakes by cutting out images from each frame output by the image sensor and changing the positions thereof, or the like may be used instead. It is also possible to use these methods in combination with each other. In other words, any such method can be applied to the present invention as long as it enables blur to be reduced in or eliminated from images that have been shot based on a calculated compensation amount.

Figure 3:
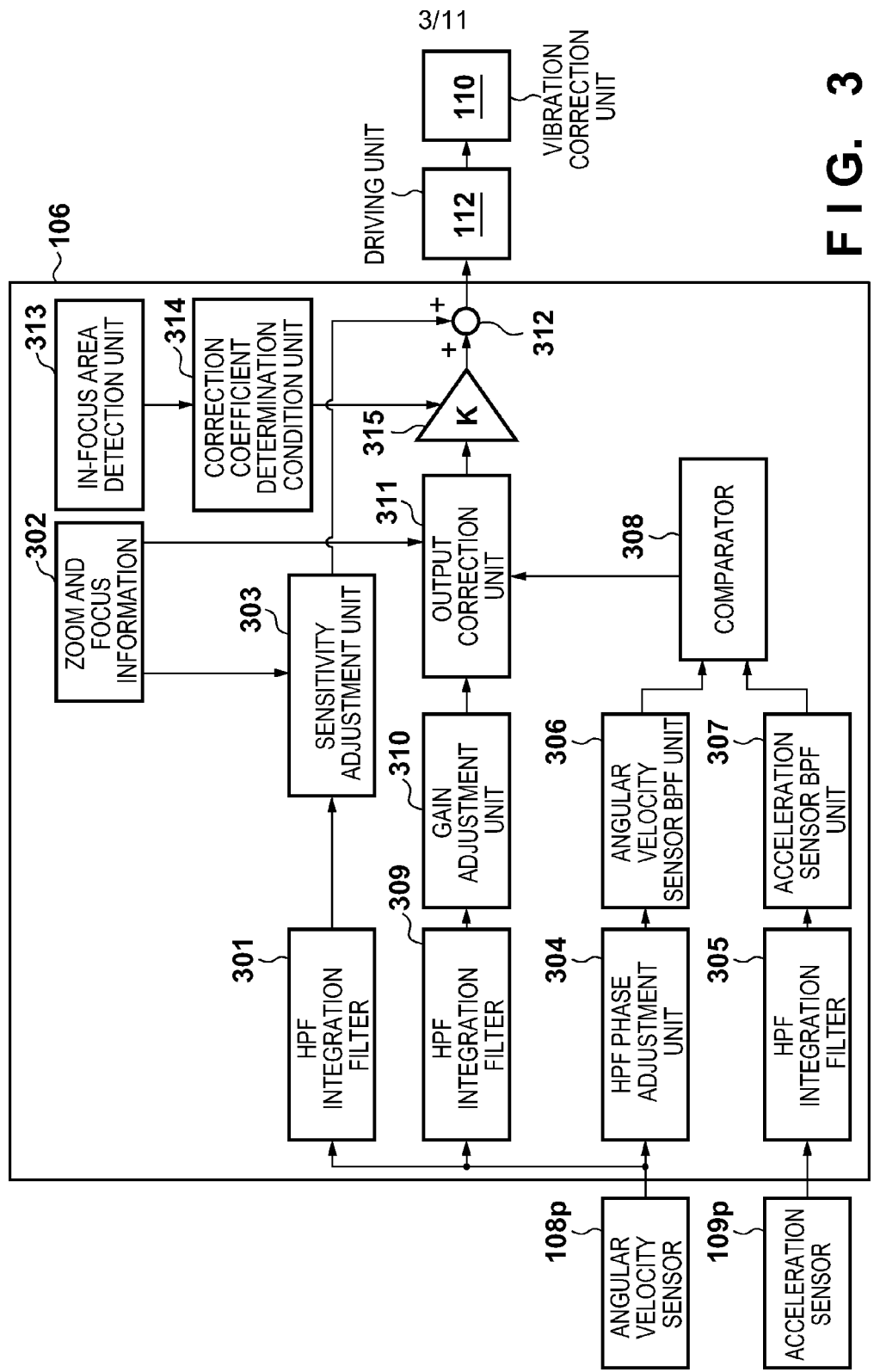
FIG. 3 is a block diagram illustrating a configuration of an image stabilization apparatus according to a first embodiment.

FIG. 3 is a block diagram illustrating the image stabilization apparatus according to the first embodiment. FIG. 3 only illustrates a configuration for shakes that occur in the vertical direction of the camera (that is, the pitch direction, or the directions indicated by the arrows 103$p$ and 104$p$ in FIG. 2). However, a similar configuration is also provided for shakes that occur in the horizontal direction of the camera (that is, the yaw direction, or the directions indicated by the arrows 103$y$ and 104$y$ in FIG. 1). Because these configurations are basically the same, only the configuration for the pitch direction is illustrated in the drawings, and the following descriptions will be given based thereon.

First, a procedure for finding a rotational shake amount will be described using FIG. 3. An angular velocity signal is input into the CPU 106 from the angular velocity sensor 108$p$. The angular velocity signal has been input into an HPF integration filter 301, and after the DC component has been cut by the high pass filter (HPF), the resultant is integrated and converted into an angular signal. Here, because the frequency band of hand shakes is generally between 1 Hz to 10 Hz, the HPF has first order HPF characteristics that cut only the frequency components not more than, for example, 0.1 Hz, which is well below the frequency band of hand shakes.

The output of the HPF integration filter 301 is input into a sensitivity adjustment unit 303. The sensitivity adjustment unit 303 amplifies the output of the HPF integration filter 301 based on a magnification ratio and a focal length found based on zoom and focus information 302, resulting in a rotational shake compensation target value (rotational shake correction amount). The sensitivity adjustment unit 303 is provided because the shake compensation sensitivity, which corresponds to the ratio of the shake amount of the camera image surface to the amount of movement of the compensation lens 111, changes due to changes in optical information such as the focus and zoom of the lens.

Next, a procedure for finding a translational shake amount will be described. The angular velocity signal from the angular velocity sensor 108$p$ is input into the aforementioned HPF integration filter 301, and is also input into an HPF integration filter 309; after the DC component has been cut by the HPF, the resultant is integrated and converted into an angular signal. The output of the HPF integration filter 309 is input into a gain adjustment unit 310. The gain and phase characteristics within the frequency band that is to undergo translational shake compensation are adjusted by the gain adjustment unit 310 and the HPF integration filter 309. The output of the gain adjustment unit 310 is input into an output correction unit 311.

At the same time the above processing is being carried out, the angular velocity signal from the angular velocity sensor 108$p$ is input into an HPF phase adjustment unit (HPF phase adjustment filter) 304, where the DC component that superimposes on the output of the angular velocity sensor 108$p$ is cut and phase adjustment is carried out on the resulting signal. The cutoff frequency employed here is aligned with the HPF cutoff frequency of an HPF integration filter 305, mentioned later, and is adjusted so that the frequency characteristics match. Only the frequency component of a predetermined bandwidth is extracted from the output of the HPF phase adjustment unit 304 by an angular velocity sensor band pass filter (BPF) unit 306.

Meanwhile, the output of the acceleration sensor 109$p$ is input into the HPF integration filter 305 of the CPU 106, and after the DC component thereof has been cut by the HPF, the resultant is integrated and converted into a velocity signal. The HPF cutoff frequency at this time is, as described above, set in accordance with the HPF frequency characteristics of the HPF phase adjustment unit 304. Only the frequency component of a predetermined bandwidth is extracted from the output of the HPF integration filter 305 by an acceleration sensor band pass filter (BPF) unit 307. Other than the acceleration sensor 109$p$, vibrations may be detected by a method different from the angular velocity sensor 108$p$. Specifically, vibrations can be detected, for example, from the speed due to an external force being applied to the vibration correction unit 110, or from the motion vector output.

The outputs from the angular velocity sensor BPF unit 306 and the acceleration sensor BPF unit 307 are input into the comparator 308, where a correction amount (correction coefficient) for correcting the output of the gain adjustment unit 310 is calculated and output to the output correction unit 311. The method for calculating a correction amount by the comparator 308 will be described later.

The output correction unit 311 receives not only the correction amount (correction coefficient) from the comparator 308, but also the zoom and focus information 302, and calculates a magnification ratio based on the zoom and focus information 302. Then, the output of the gain adjustment unit 310 is corrected based on the obtained magnification ratio and the correction amount from the comparator 308, and a translational shake correction target value (translational shake correction amount) is obtained.

An in-focus area detection unit 313 detects an in-focus area of the object. After that, a correction coefficient determination condition unit 314 determines a correction gain K, which is to be multiplied by the translational shake correction amount in an amplifier 315, according to the in-focus area. The gain determination by the in-focus area detection unit 313 and the correction coefficient determination condition unit 314 will be described in detail later.

Then, in the amplifier 315, the translational shake correction amount obtained by the output correction unit 311 is multiplied by the correction gain K. Then, in an addition unit 312, the product is summed (combined) with the rotational shake correction amount, and the summed value (combined value) is output to the driving unit 112 as the final correction amount. The vibration correction unit 110 is driven by the driving unit 112 based on the summed value, and image blurs due to both rotational shakes and translational shakes are corrected.

Next, the correction value output from the comparator 308, a rotational shake correction amount and a translational shake correction amount will be described.

Figure 4:
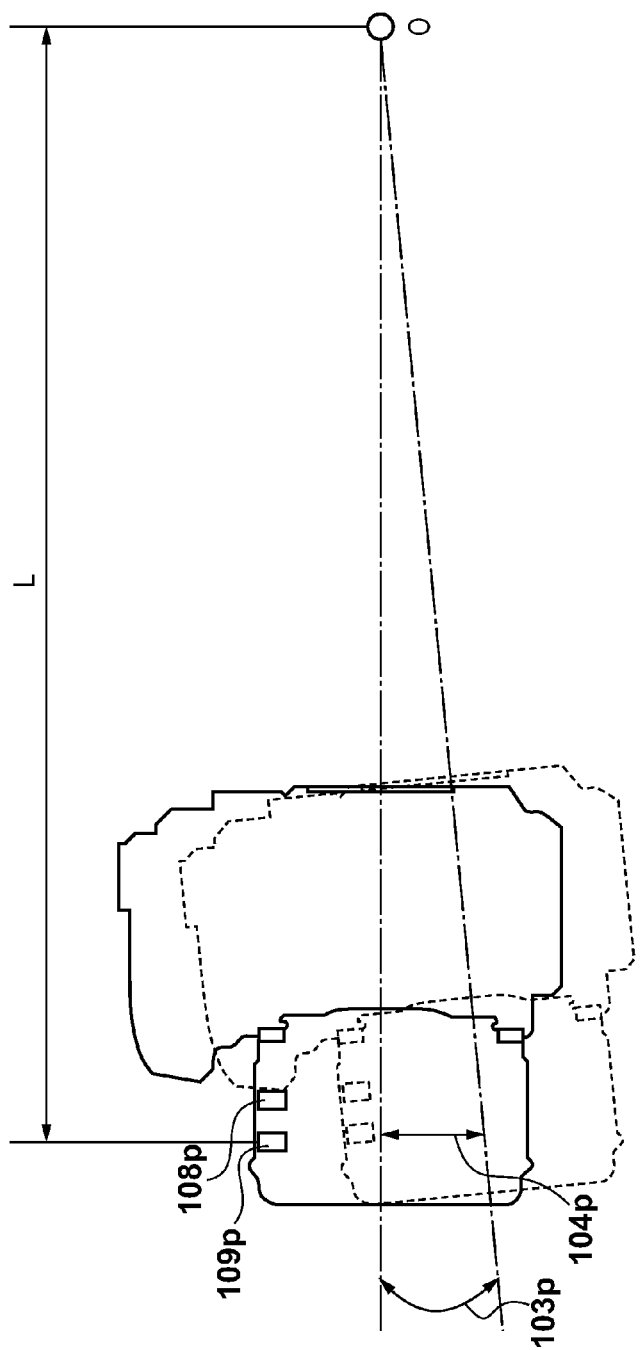
FIG. 4 is a descriptive diagram illustrating the center of rotation of a shake according to the first embodiment.

FIG. 4 is a diagram illustrating rotational shakes 103$p$ and translational shakes 104$p$ that act on the camera 101. Here, the shake amount of the translational shakes 104$p$ at the principal point of the optical imaging system in the shooting lens of the camera 101 is taken as Y, whereas the shake angle of the rotational shakes 103$p$ is taken as θ. A center of rotation O is then determined, and when the radius of rotation, which is the distance from the center of rotation O to the acceleration sensor 109$p$, is taken as L, the relationship between the shake amount Y, the shake angle θ, and the radius of rotation L can be expressed by the following Formula (1).

$$Y = L\theta \quad (1)$$

Note that in Formula (1), the shake amount Y can be found by taking a second-order integral of the output of the acceleration sensor 109$p$, and the shake angle θ can be found by taking a first-order integral of the output of the angular velocity sensor 108$p$. Meanwhile, the relationship between a velocity V found by taking a first-order integral of the output of the acceleration sensor 109$p$, an angular velocity ω obtained from the output of the angular velocity sensor 108$p$, and the radius of rotation L can be expressed by the following Formula (2).

$$V = L\omega \quad (2)$$

Furthermore, the relationship between an acceleration A obtained from the output of the acceleration sensor 109p, an angular acceleration ωa found by taking the first-order differential of the output of the angular velocity sensor 108p, and the radius of rotation L can be expressed by the following Formula (3).

$$A = L\omega a \quad (3)$$

The radius of rotation L can be found through any of the aforementioned Formulas (1) through (3).

Meanwhile, a shake δ occurring in the imaging surface can be expressed through the following Formula (4), using the shake amount Y of the translational shake at the principal point of the optical imaging system, the shake angle θ of the optical imaging system, and a focal length f and magnification ratio β of the optical imaging system.

$$\delta = (1+\beta)f\theta + \beta Y \quad (4)$$

Here, the focal length f, which is the first term on the right side of the Formula (4), can be found from the zoom and focus information 302 of the optical imaging system. In addition, the magnification ratio β expresses the ratio of the size of an image of a subject formed on the image sensor 107 relative to the actual size of the subject, and can also be found from the zoom and focus information 302 of the optical imaging system. Furthermore, the shake angle θ can be found from the integration result of the output of the angular velocity sensor 108p. Accordingly, the rotational shake correction value can be found from these information as described with reference to FIG. 3.

The second term on the right side can be found from the shake amount Y of the translational shake, which is a second-order integral of the output from the acceleration sensor 109p, and the magnification ratio β, and therefore the translational shake compensation target value can be found from these information.

However, in the present first embodiment, shake compensation is carried out on the shake δ, expressed by the following Formula (5) using the Formulas (1) and (4).

$$\delta = (1+\beta)f\theta + \beta L\theta \quad (5)$$

In other words, for the translational shake, the shake amount Y found directly from the acceleration sensor 109p is not used. Instead, first, the radius of rotation L is found from Formula (1), Formula (2), or Formula (3), and the output correction unit 311 corrects the shake angle θ using the radius of rotation L, and the magnification ratio β which is the integration result of the output of the angular velocity sensor 108p and obtained from the zoom and focus information 302.

The comparator 308 calculates the radius of rotation L (correction amount) by solving Formula (2) for L, which results in Formula 6), based on the output of the angular velocity sensor BPF unit 306 and the acceleration sensor BPF unit 307.

$$L = V/\omega \quad (6)$$

The radius of rotation L may be calculated from the ratio between the maximum amplitude peak values of the velocity V and the angular velocity ω within a predetermined amount of time (for example, set to approximately 200 ms in the case where the cutoff frequency of the angular velocity sensor BPF unit 306 and the acceleration sensor BPF unit 307 is 5 Hz). Furthermore, the radius of rotation L (correction amount) may be updated each time the velocity V and the angular velocity ω, respectively, have been calculated. At this time, a radius of rotation from which a high-frequency noise component occurring when the radius of rotation is calculated has been removed can be calculated by averaging the velocity V and the angular velocity ω in time sequence, cutting the high-frequency component using a low-pass filter (LPF), and so on.

Figure 5A:
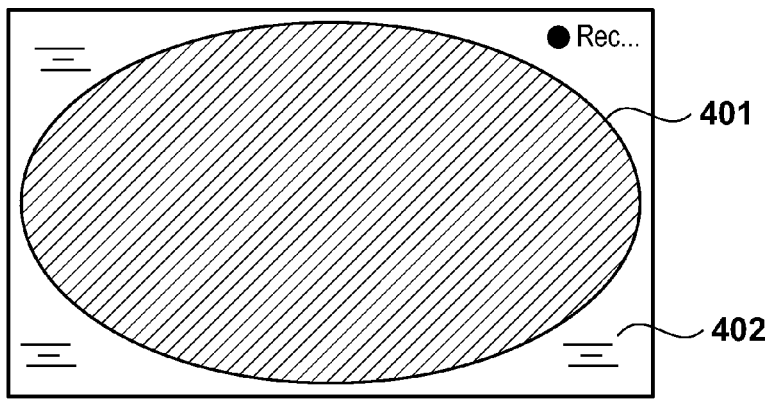
FIGS. 5A and 5B are descriptive diagrams illustrating the influence of vibration correction in the case where the sizes of an in-focus area are different during moving image shooting according to the first embodiment.
Figure 5B:
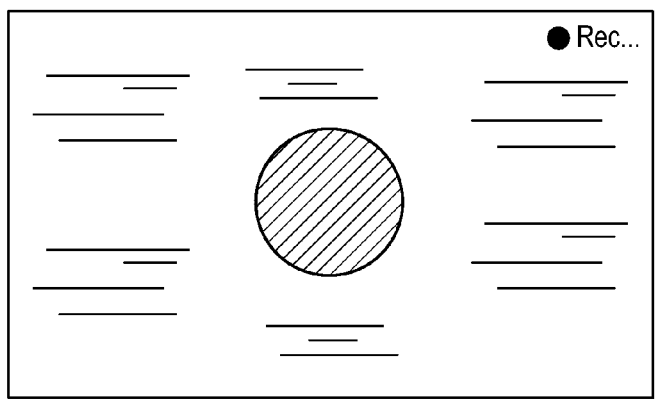

Next, FIGS. 5A and 5B show close range shooting conditions when shooting a moving image. FIG. 5A shows an example in which a main object 401 is large with respect to the screen (the entire image), or in other words, the in-focus area is large. Normally, vibration correction should be performed on both image blur of the main object caused by camera shake and image blur of the background caused by camera shake. However, the amount of control needed to perform vibration correction on the main object 401 and the amount of control needed to perform vibration control on a background 402 other than the main object are different. As can be seen from Formula (5), the reason that the amounts of control are different is that the amount of image blur on the imaging surface differs depending on the magnification ratio of the object. In the case of FIG. 5A, the main object accounts for a large proportion of the screen, and thus even if vibration correction is performed properly on the main object 401, the image blur of the background 402 will be less conspicuous.

On the other hand, as shown in FIG. 5B, in the case where the main object 401 is small with respect to the screen, or in other words, the in-focus area is small, even if vibration correction is performed properly on the main object 401, the image blur of the background 402 may become conspicuous. For example, in the case where the object distance to the main object is as short as about 10 cm, and the object distance to the background is as long as about 1 m, the magnification ratio of the main object is very high, and the magnification ratio of the background is very low. Accordingly, if the image blur of the main object is properly controlled, the background will be overcorrected, resulting in a captured image in which the background is blur. In this case, a large difference occurs particularly in the translational shake amount indicated by the second term of Formula (5). Accordingly, in the case where the in-focus area of the main object 401 is small as shown in FIG. 5B, by suppressing the translational shake correction amount, a preferable image is obtained.

Figure 6:
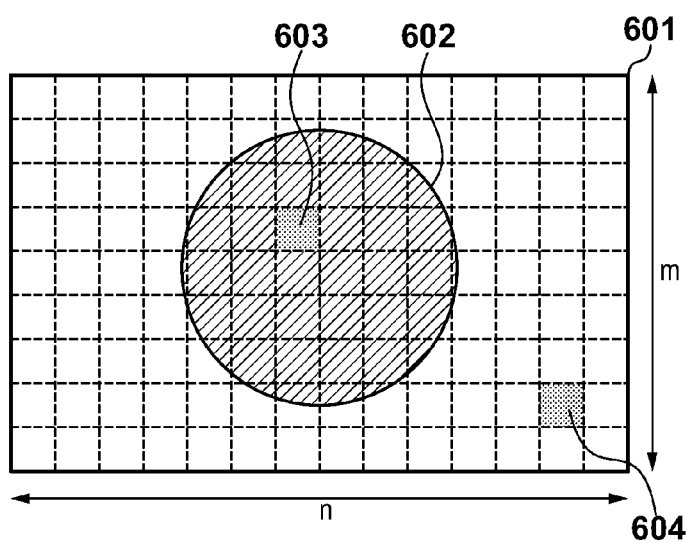
FIG. 6 is a descriptive diagram illustrating a method for determining an in-focus area according to the first embodiment.

Next, the method for determining the correction gain K that is to be multiplied by the translational shake correction amount in the amplifier 315 will be described. FIG. 6 is a descriptive diagram illustrating a method for detecting an in-focus area of the main object during moving image recording by the in-focus area detection unit 313. A frame 601 of a moving image is divided into n×m, then, the average contrast AF value is obtained for each divided region obtained as a result of the division, and thereby the average focus value is determined. Next, in the entire frame, the difference in the average contrast AF value is obtained between a divided region 603 having the highest average contrast AF value and a divided region 604 having the lowest average contrast AF value, and the resulting value is defined as a threshold value for the AF evaluation value for detecting the main object.

Figure 7:
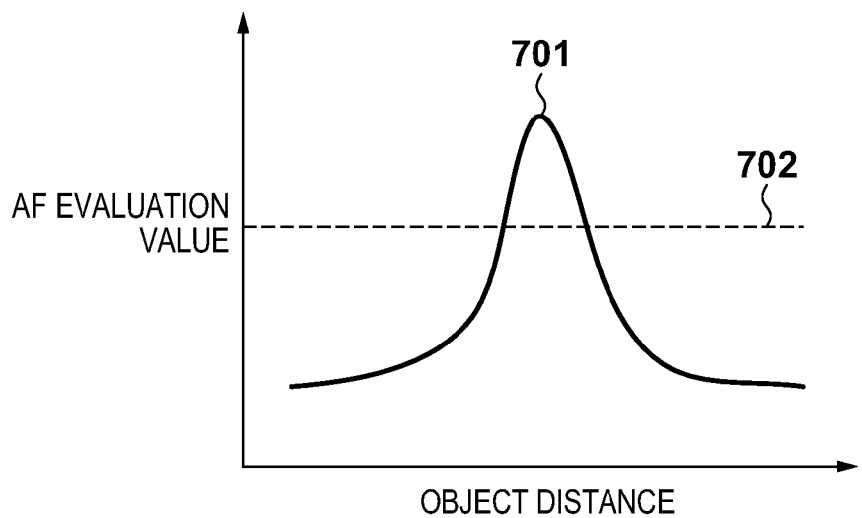
FIG. 7 is a descriptive diagram illustrating a method for determining an in-focus area according to the first embodiment.

FIG. 7 is a descriptive diagram illustrating in-focus determination based on the AF evaluation value and showing the relationship of contrast AF evaluation value 701 versus object distance. As shown in FIG. 7, in the case where there is an object at a specific object distance, the AF evaluation value 701 is high. Accordingly, a comparison is performed between a predetermined threshold value 702 and the AF evaluation value 701. If the AF evaluation value 701 is greater than or equal to the threshold value 702, it is determined that the divided region is in focus. If the AF evaluation value 701 is less than the threshold value 702, it is determined that the divided region is not in focus. This processing is performed for each divided region shown in FIG. 6, and then the proportion of the divided regions that have been determined to be in focus with respect to the entire screen is calculated.

Figure 8:
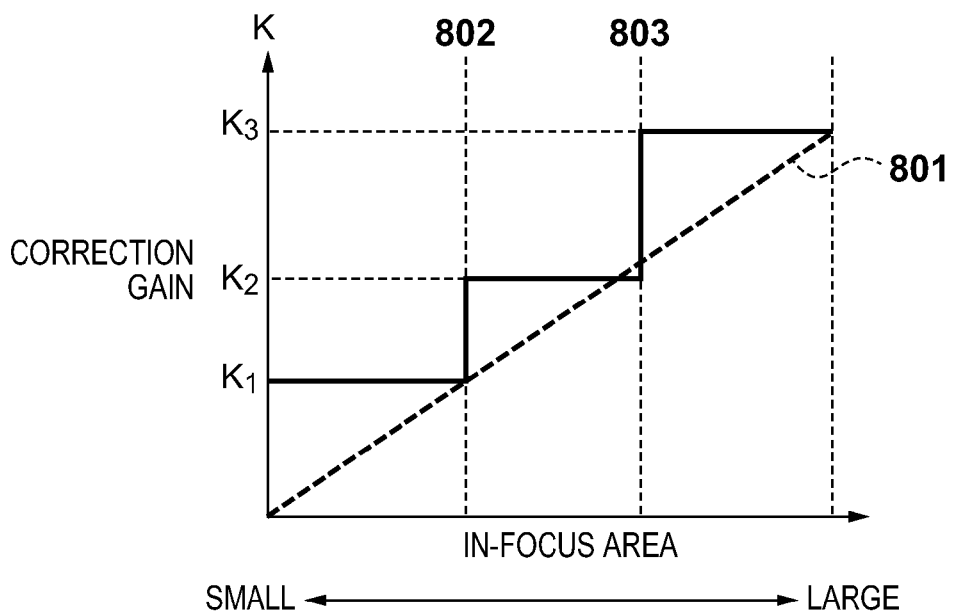
FIG. 8 is a diagram showing an example of a relationship between the proportion of an in-focus area and the correction gain K according to the first embodiment.

FIG. 8 shows an example of a relationship between the proportion of an in-focus area and the correction gain K. Based on this relationship, the correction gain K is determined by the correction coefficient determination condition unit 314. In the first embodiment, threshold values 802 and 803 are set depending on the proportion of an in-focus area of the main object, and each correction gain K, which is to be multiplied by the corresponding translational shake correction amounts, is determined. In the above description, two threshold values are set to determine the correction gain K, but more threshold values may be set. Alternatively, only one threshold value may be set. In a region in which the proportion of an in-focus area of the main object is less than the threshold value 802, or in other words, in the case where the in-focus area of the main object is small (for example, less than 30%), if vibration correction is performed on the main object, the difference in vibration correction between the main object and the background will be conspicuous. To address this problem, the translational shake correction gain K is set to a value $K_1$ (for example, about 0.3 fold), which is close to 0, so as to suppress the translational shake correction.

In a region in which the proportion of an in-focus area of the main object is not less than the threshold value 802 and less than the threshold value 803, or in other words, in the case where the proportion of an in-focus area of the main object is in the medium range (for example, not less than 30% and less than 70%), because the main object and the background are present at about the same proportion in the frame, the correction gain K is set to, for example, $K_2$ that is about 0.6 fold.

In the case where the proportion of an in-focus area of the main object is not less than the threshold value 803, because the in-focus area of the main object is large (for example, not less than 80%), that is, the main object accounts for a large proportion of the screen, even if translational shake correction is performed actively on the main object, the difference in vibration correction between the main object and the background will be unnoticeable. Accordingly, in order to perform translational shake correction actively on the main object, the correction gain K is set to, for example, $K_3$ that is about 1 fold.

Figure 9A:
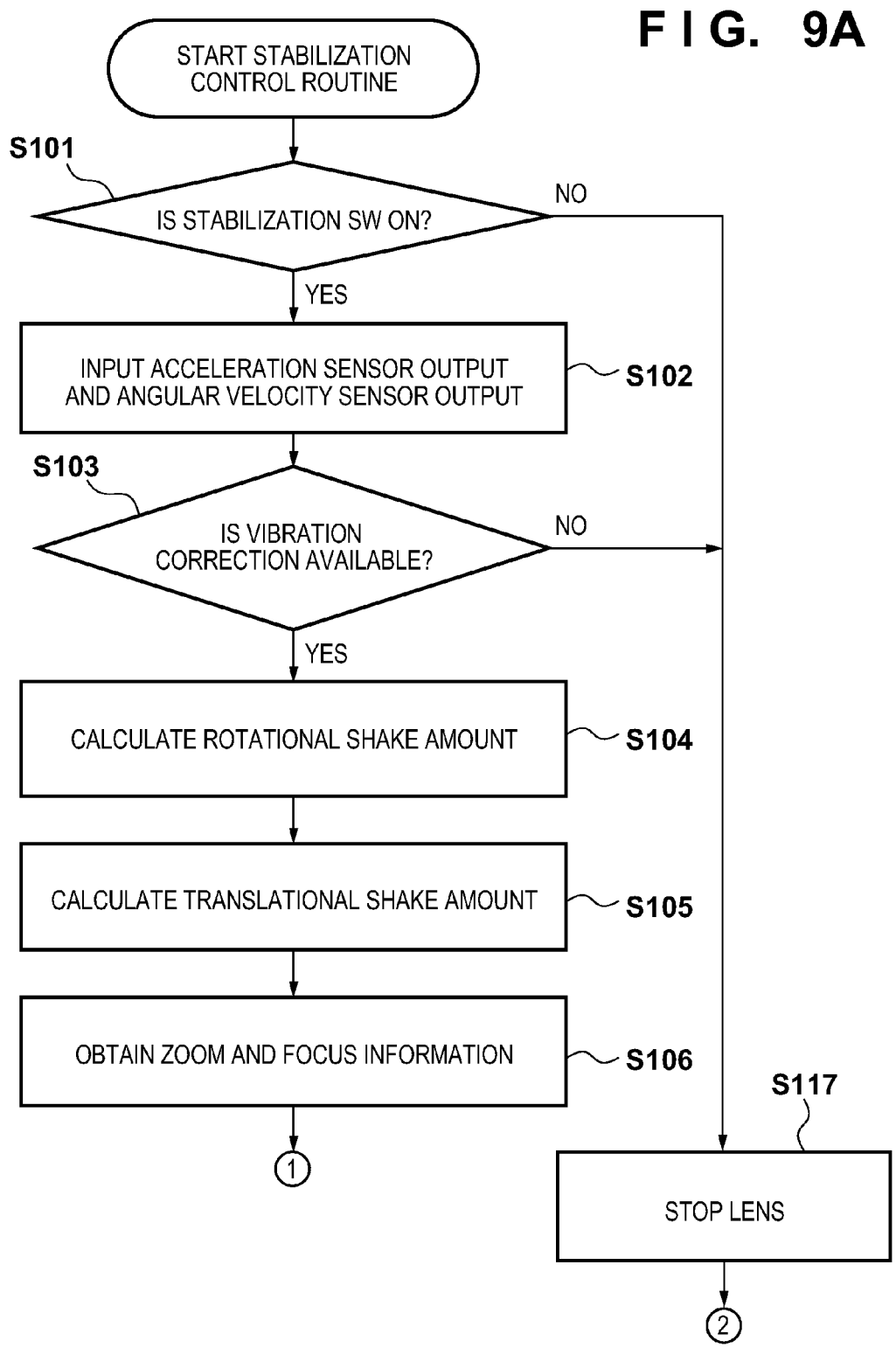

An overall stabilization control operation according to the first embodiment will be described next with reference to the flowchart shown in FIGS. 9A and 9B. This processing is started upon the main power of the camera being turned on, and executed at a fixed sampling period.

First, in step S101, the state of a stabilization SW is detected. If the stabilization SW is on, the procedure advances to step S102. If, on the other hand, the stabilization SW is off, the procedure advances to step S117, where the operation of the vibration correction lens is stopped, and the stabilization control routine ends. Then, the image stabilization apparatus waits for the next sampling period. In step S102, the output of the acceleration sensor 109p and the output of the angular velocity sensor 108p are input.

In step S103, it is determined whether or not it is in a vibration correction available state. If it is determined that it is in a vibration correction available state, the procedure advances to step S104. Otherwise, the procedure advances to step S117. More specifically, in step S103, it is determined whether power supply has been started and the outputs from the acceleration sensor 109p and the angular velocity sensor 108p are stable. Until the outputs become stable, it is determined that it is not in a vibration correction available state. After the outputs become stable, it is determined that it is in a vibration correction available state. This prevents stabilization performance degradation while the output values are unstable immediately after the start of power supply.

In step S104, the rotational shake amount is calculated by the method described with reference to FIG. 3. In step S105, the translational shake amount is calculated. Next, in step S106, zoom lens position and focus lens position information are obtained.

In step S107, it is determined whether a moving image is being captured. If it is determined that a moving image is being captured, the procedure advances to step S108. In step S108, the AF evaluation value is obtained. In step S109, the in-focus area of the main object is calculated based on the AF evaluation value. In step S110, the rotational shake correction coefficient and the translational shake correction coefficient for moving image shooting are calculated according to the calculated in-focus area, and the procedure advances to step S113. According to the first term of the right side of Formula (5), the rotational shake correction coefficient is determined to be $(1+\beta)f$ by the focal length f and the magnification ratio $\beta$. Also, according to the second term on the right side of Formula (5), the translational shake correction coefficient is determined to be $\beta L$ by the magnification ratio $\beta$ and the radius of rotation L. In the first embodiment, furthermore, as will be described later, the final vibration correction amount is obtained by multiplying the translational shake correction amount by the correction gain K and combining the product with the rotational shake correction amount. Accordingly, the correction gain K is also determined at this stage.

If, on the other hand, it is determined in step S107 that a moving image not being captured, then in step S111, it is determined that a still image is being captured. In step S112, the rotational shake correction coefficient and the translational shake correction coefficient for still image shooting are calculated. In step S112 as well, as in step S110, as shown by Formula (5) given above, the rotational shake correction coefficient is determined by the focal length f and the magnification ratio $\beta$, and the translational shake correction coefficient is determined to be $\beta L$ by the magnification ratio $\beta$ and the radius of rotation L. In the still image shooting mode, however, stabilization for still image shooting is performed by a SW 2 being pressed down, and thus the magnification ratio $\beta$ immediately before the still image shooting is used as the magnification ratio $\beta$ for use in calculation of the rotational shake correction coefficient and the translational shake correction coefficient. The magnification ratio $\beta$ for stabilization control calculated for moving image may have a delay with respect to the actual magnification ratio or may be set to a small value in order to prevent overcontrol. However, in still image shooting, shooting is performed after completion of AF operation, and thus it is better to continuously use, as the magnification ratio $\beta$, the magnification ratio obtained from the zoom lens position and focus lens position information. Therefore, after the SW 2 has been pressed down, the magnification ratio $\beta$ after completion of AF operation and immediately before shooting is continuously used to calculate the rotational shake correction coefficient and the translational shake correction coefficient, whereby stabilization optimal for still image shooting can be performed.

Next, in step S113, the rotational shake correction amount is calculated from the rotational shake correction coefficient obtained in step S110 or S112 according to the first term on the right side of Formula (5), and the procedure advances to step S114. In step S114, the translational shake correction amount is calculated from the translational shake correction coefficient obtained in step S110 or S112 according to the second term on the right side of Formula (5), and the procedure advances to step S115.

In step S115, combining vibration correction amounts is performed by using the correction gain K, or in other words, the rotational shake correction amount and the translational shake correction amount are summed up. In step S116, the vibration correction lens is driven based on the determined vibration correction amount. The stabilization control routine ends, and the image stabilization apparatus waits for the next sampling period.

As described above, according to the first embodiment, during moving image shooting, correction is performed by multiplying the translational shake correction amount by an appropriate gain according to the in-focus area of the main object, whereby the main object and the background can be corrected in good balance.

The foregoing has described an example in which the correction gain K is set using the threshold values 802 and 803 based on the proportion of an in-focus area, but the present invention is not limited thereto, and as shown by the graph 801 of FIG. 8, the correction gain K may be continuous values with respect to the proportion of an in-focus area.

<Second Embodiment>

A second embodiment of the present invention will be described next. The second embodiment is different from the first embodiment in the following points.

In the first embodiment, the correction amount is adjusted by multiplying the translational shake correction amount by the correction gain K according to the in-focus area of the main object. In the second embodiment, rather than performing multiplication using the correction gain K after the translational shake correction amount has been calculated, the translational shake correction amount is adjusted by calculating the magnification ratio from the zoom and object distance information according to the in-focus area of the main object and multiplying the magnification ratio by the correction gain K. Also, in the first embodiment, only the translational shake correction amount is multiplied by the correction gain, whereas in the second embodiment, the rotational shake correction amount is also adjusted by multiplying the magnification ratio for rotational shake by the correction gain.

Accordingly, the amount of vibration on the imaging surface where the magnification ratio is multiplied by the correction gain is defined by Formula (7).

$$\delta = (1 + K_a \beta) f \theta + K_b \beta Y \quad (7)$$

Figure 10:
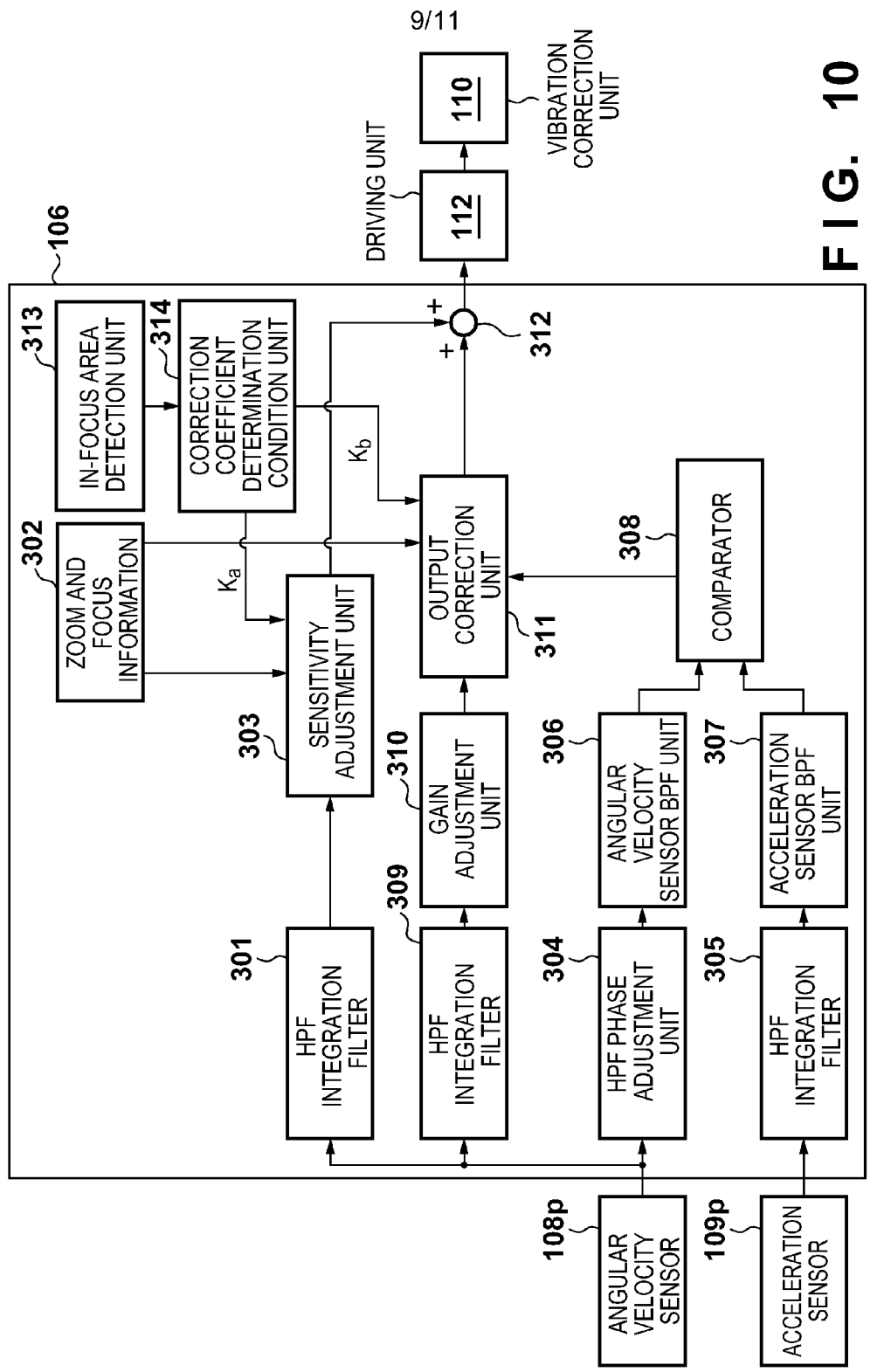
FIG. 10 is a block diagram showing a configuration of a stabilization control apparatus according to a second embodiment.

FIG. 10 shows a stabilization system according to the second embodiment. The in-focus area of the main object is calculated by the in-focus area detection unit 313, and the correction gain $K_a$ that has been set by the correction coefficient determination condition unit 314 is set in the sensitivity adjustment unit 303. Also, the correction gain $K_b$ that has been set by the correction coefficient determination condition unit 314 is set in the output correction unit 311.

The correction gains $K_a$ and $K_b$ can be obtained in the same manner as the correction gain K is obtained, described in the first embodiment with reference to FIG. 8. However, as the correction gains $K_1$ to $K_3$ shown in FIG. 8, $K_a$ and $K_b$ may be set to the same value or may be set to different values.

As described above, according to the second embodiment, the rotational shake correction amount and the translational shake correction amount can be changed by multiplying the magnification ratios β by the correction gains, and thus vibration correction can be properly performed on the main object and the background.

The second embodiment above was described taking an example in which the rotational shake correction coefficient is also multiplied by the correction gain $K_a$, but only the translational shake correction coefficient may be multiplied by the correction gain $K_b$.

<Variation of Second Embodiment>

Figure 11:
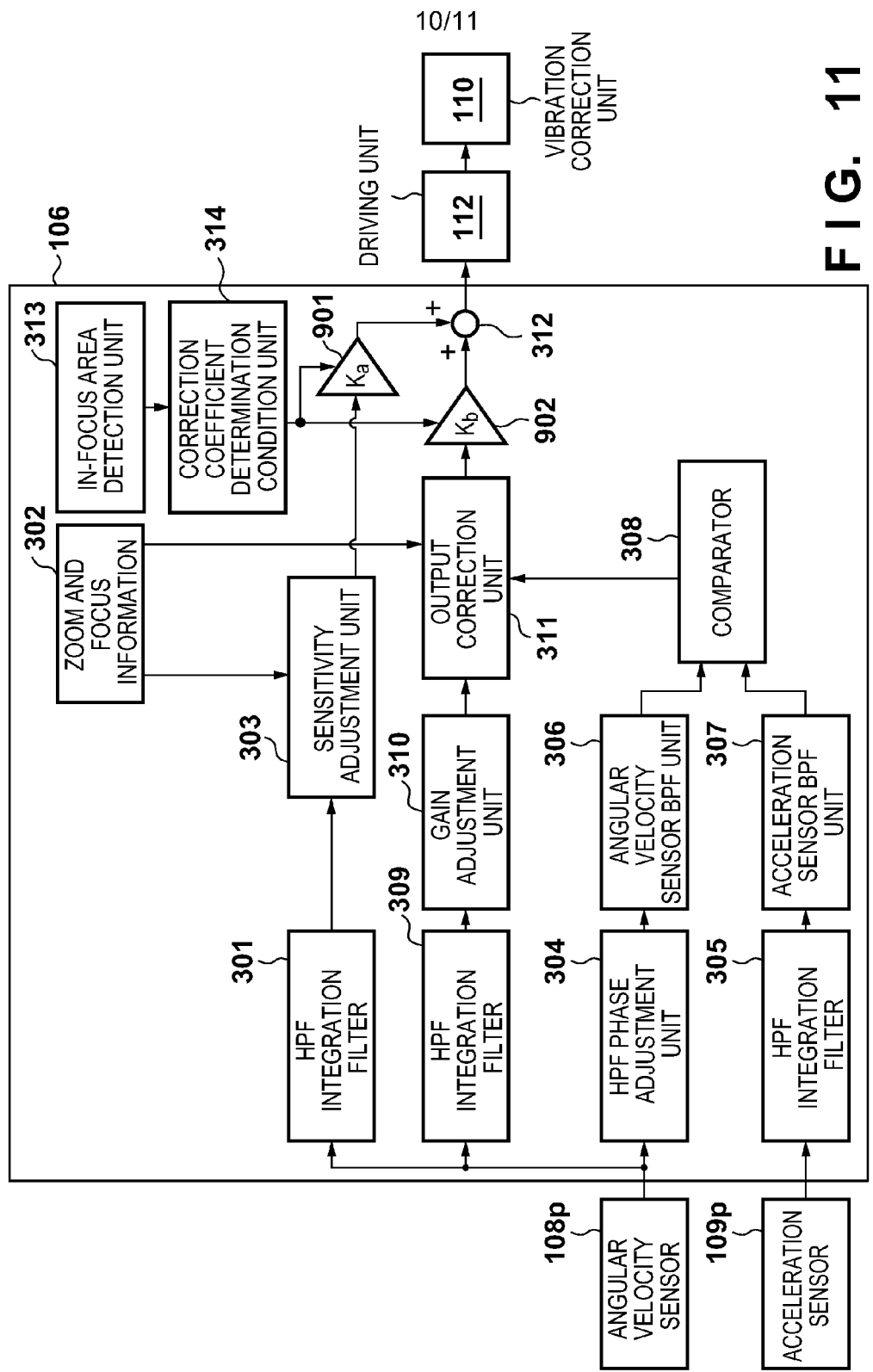
FIG. 11 is a block diagram showing a configuration of a stabilization control apparatus according to a variation of the second embodiment.

The second embodiment was described taking an example in which the correction gains $K_a$ and $K_b$ that have been set by the correction coefficient determination condition unit 314 are set in the sensitivity adjustment unit 303 and the output correction unit 311. In this variation, as shown in FIG. 11, the correction gains $K_a$ and $K_b$ that have been set by the correction coefficient determination condition unit 314 are set in a rotational shake correction amplifier 901 and a translational shake correction amplifier 902. In this manner, the effects similar to those of the second embodiment can be obtained.

<Third Embodiment>

A third embodiment of the present invention will be described next. The third embodiment is different from the first and second embodiments in the following points.

In the first embodiment, adjustment is performed by multiplying the translational shake correction amount by the correction gain K according to the in-focus area of the main object, and in the second embodiment, the rotational shake correction amount and the translational shake correction amount are adjusted by setting the correction gains $K_a$ and $K_b$ for the magnification ratio according to the in-focus area of the main object. In the third embodiment, the correction gain K is determined according to the in-focus area and magnification ratio information, rather than according to only the in-focus area.

Figure 12:
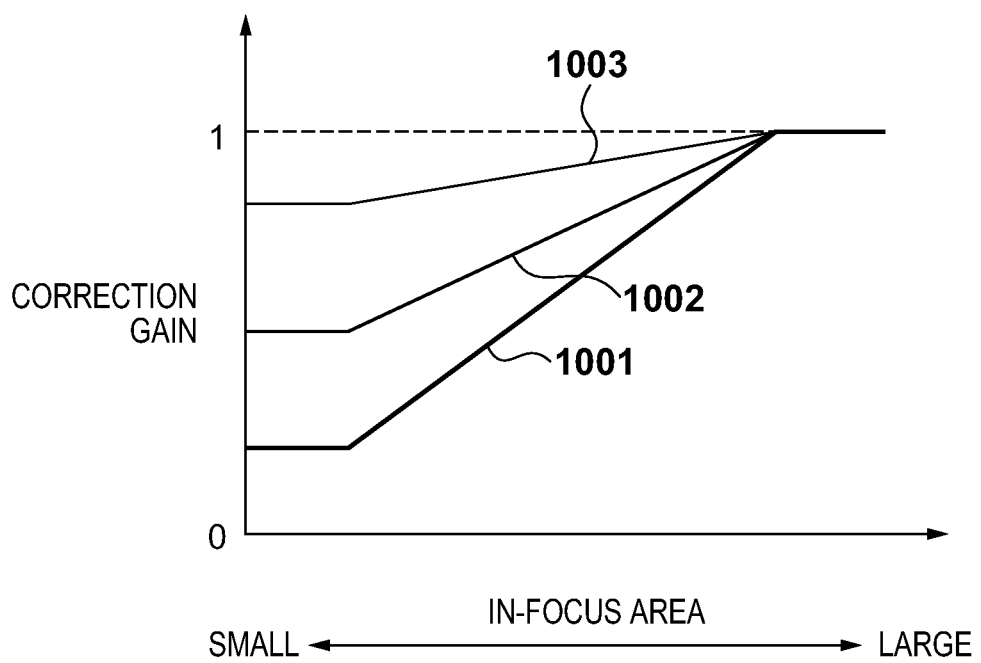
FIG. 12 is a diagram showing an example of a correction coefficient according to a third embodiment.

FIG. 12 is a diagram showing a correction gain according to the in-focus area and the magnification ratio. Reference numeral 1001 indicates correction gain characteristics according to the in-focus area in the case where the magnification ratio is high (for example, not less than 0.5 fold), 1002 indicates correction gain characteristics according to the in-focus area in the case where the magnification ratio is medium (for example, 0.1 fold), and 1003 indicates correction gain characteristics according to the in-focus area in the case where the magnification ratio is low (for example, not greater than 0.01 fold).

If the in-focus area is large, irrespective of the value of the magnification ratio, the correction gain K can be set to about 1 fold and vibration correction can be performed actively on the main object. This is because no problem arises even if vibration correction is performed actively on the main object since when the in-focus area is large, the main object accounts for a large proportion of the screen and thus if vibration correction is properly performed on the main object, image blur of the background will be less conspicuous. However, when the in-focus area is small and there is a large difference in image blur between the main object and the background, if proper control is performed on the main object, the image blur of the background will be large. In other words, when the magnification ratio of the main object is high and the magnification ratio of the background is low, there will be a very large difference in image blur between the main object and the background, making the image blur conspicuous. In contrast, when the magnification ratio of the main object is low and the magnification ratio of the background is also low, there will be not much difference in image blur between the main object and the background, making the image blur less conspicuous.

Accordingly, when the in-focus area is small, the correction gain is set smaller as the magnification ratio of the main object becomes higher, whereby image blur due to overcorrection of the background can be prevented. Also, when the magnification ratio of the main object is low, the correction gain is set to a value that is not as small as that when the magnification ratio is high, so that stabilization control can be properly performed on the object and the background.

As described above, according to the third embodiment, the magnification ratio is multiplied by the correction gain according to the magnification ratio of the main object during moving image shooting, whereby the main object and the background can be corrected in good balance.

The applications of the present invention are not limited to digital single-lens reflex cameras, interchangeable lenses thereof and stabilization control apparatuses for digital compact cameras, and the present invention is also applicable to image shooting with digital video cameras, as well as to image capturing apparatuses incorporated in surveillance cameras, web cameras, mobile phones and the like.

The first to third embodiments given above have described examples in which the translational shake correction amount is determined based on the outputs of the angular velocity sensor $108p$ ($108y$ in the case of the yaw direction) and the acceleration sensor $109p$ ($109y$ in the case of the yaw direction). However, the method for obtaining the translational shake correction amount is not limited thereto, and other methods may be used such as, for example, determining from only the outputs from the acceleration sensors, determining from the speed due to external force applied to the vibration correction unit 110, and determining from the motion vector output. In this case as well, as discussed in the first to third embodiments, the gain that is to be multiplied by the translational shake correction amount can be changed based on at least the size of the main object with respect to the entire screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-280244, filed on Dec. 21, 2011 which is hereby incorporated by reference herein in its entirety.

What is claimed is:

1. An image stabilization apparatus comprising:
    a vibration correction unit that corrects image blur due to vibrations;
    a first vibration detection unit that detects an angular velocity of vibrations;
    a first calculation unit that calculates a rotational shake correction amount based on an output from the first vibration detection unit;
    a second vibration detection unit that detects vibrations by using a method different from that of the first vibration detection unit;
    a second calculation unit that calculates a correction value from outputs from the first vibration detection unit and the second vibration detection unit and calculates a translational shake correction amount based on the correction value and the output of the first vibration detection unit;
    a driving unit that drives the vibration correction unit based on at least one of the rotational shake correction amount and the translational shake correction amount; and
    a first changing unit that, when a main object accounts for a smaller proportion of an entire screen, changes the translational shake correction amount so as to be smaller than that when the main object accounts for a larger proportion.

2. The image stabilization apparatus according to claim 1, further comprising a focus detection unit that determines the main object by a focusing operation.

3. The image stabilization apparatus according to claim 1, wherein the first changing unit further changes the translational shake correction amount according to a magnification ratio, and when the magnification ratio is higher, changes the translational shake correction amount so as to be smaller than that when the magnification ratio is lower.

4. The image stabilization apparatus according to claim 1, further comprising a second changing unit that, when the main object accounts for a smaller proportion of the entire screen, changes the rotational shake correction amount so as to be smaller than that when the main object accounts for a larger proportion.

5. The image stabilization apparatus according to claim 4, wherein the second changing unit further changes the rotational shake correction amount according to a magnification ratio, and when the magnification ratio is higher, changes the rotational shake correction amount so as to be smaller than that when the magnification ratio is lower.

6. An optical apparatus comprising the image stabilization apparatus according to claim 1.

7. An imaging apparatus comprising the image stabilization apparatus according to claim 1.

8. The image stabilization apparatus according to claim 1, wherein the second vibration detection unit detects an acceleration or a motion vector of the vibrations.

9. A control method for an image stabilization apparatus including a vibration correction unit that corrects image blur due to vibrations, the method comprising:
    detecting an angular velocity of vibrations with a first vibration detection unit;
    calculating a rotational shake correction amount based on an output from the first vibration detection unit;
    detecting vibrations with a second vibration detection unit by using a method different from that of the first vibration detection unit;
    calculating a correction value from the output of the first vibration detection unit and an output of the second vibration detection unit and calculating a translational shake correction amount based on the correction value and the output of the first vibration detection unit;
    driving the vibration correction unit based on at least one of the rotational shake correction amount and the translational shake correction amount; and
    changing, when a main object accounts for a smaller proportion of an entire screen, the translational shake correction amount so as to be smaller than that when the main object accounts for a larger proportion.

10. The control method according to claim 9, further comprising determining the main object by a focusing operation.

11. The control method according to claim 9, further comprising;
    changing the translational shake correction amount according to a magnification ratio, and when the magnification ratio is higher, changing the translational shake correction amount so as to be smaller than that when the magnification ratio is lower.

12. The control method according to claim 9, further comprising;
    changing, when the main object accounts for a smaller proportion of the entire screen, the rotational shake correction amount so as to be smaller than that when the main object accounts for a larger proportion.

13. The control method according to claim 12, further comprising;
changing the rotational shake correction amount according to a magnification ratio, and when the magnification ratio is higher, changing the rotational shake correction amount so as to be smaller than that when the magnification ratio is lower.

14. The control method according to claim 9, wherein the second vibration detection unit detects an acceleration or a motion vector of the vibrations.

15. An image stabilization apparatus comprising:
a vibration correction unit that corrects image blur due to vibrations;
a first vibration detection unit that detects an angular velocity of vibrations;
a first calculation unit that calculates a rotational shake correction amount based on an output from the first vibration detection unit;
a second vibration detection unit that detects vibrations by using a method different from that of the first vibration detection unit;
a second calculation unit that calculates a correction value from outputs from the first vibration detection unit and the second vibration detection unit and calculates a translational shake correction amount based on the correction value and the output of the first vibration detection unit;
a driving unit that drives the vibration correction unit based on at least one of the rotational shake correction amount and the translational shake correction amount; and
a first changing unit that, when a main object accounts for a smaller proportion of an entire screen, changes a correction gain of the translational shake correction amount so as to be smaller than that when the main object accounts for a larger proportion.

16. A control method for an image stabilization apparatus including a vibration correction unit that corrects image blur due to vibrations, the method comprising:
detecting an angular velocity of vibrations with a first vibration detection unit;
calculating a rotational shake correction amount based on an output from the first vibration detection unit;
detecting vibrations with a second vibration detection unit by using a method different from that of the first vibration detection unit;
calculating a correction value from the output of the first vibration detection unit and an output of the second vibration detection unit and calculating a translational shake correction amount based on the correction value and the output of the first vibration detection unit;
driving the vibration correction unit based on at least one of the rotational shake correction amount and the translational shake correction amount; and
changing, when a main object accounts for a smaller proportion of an entire screen, a correction gain of the translational shake correction amount so as to be smaller than that when the main object accounts for a larger proportion.

* * * * *